Sept. 13, 1927.
W. H. FARNSWORTH
GAS TANK VALVE
Filed June 17, 1926
1,642,412
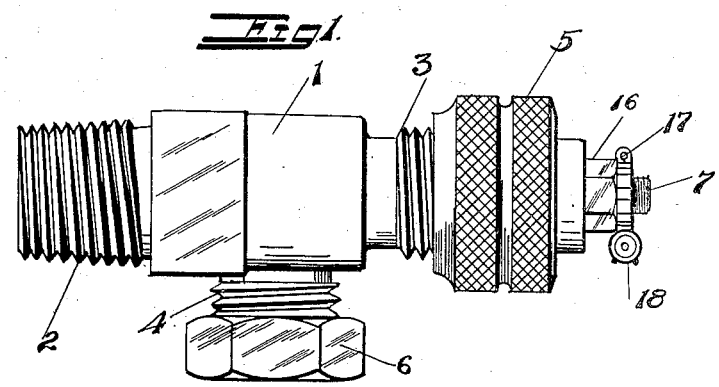
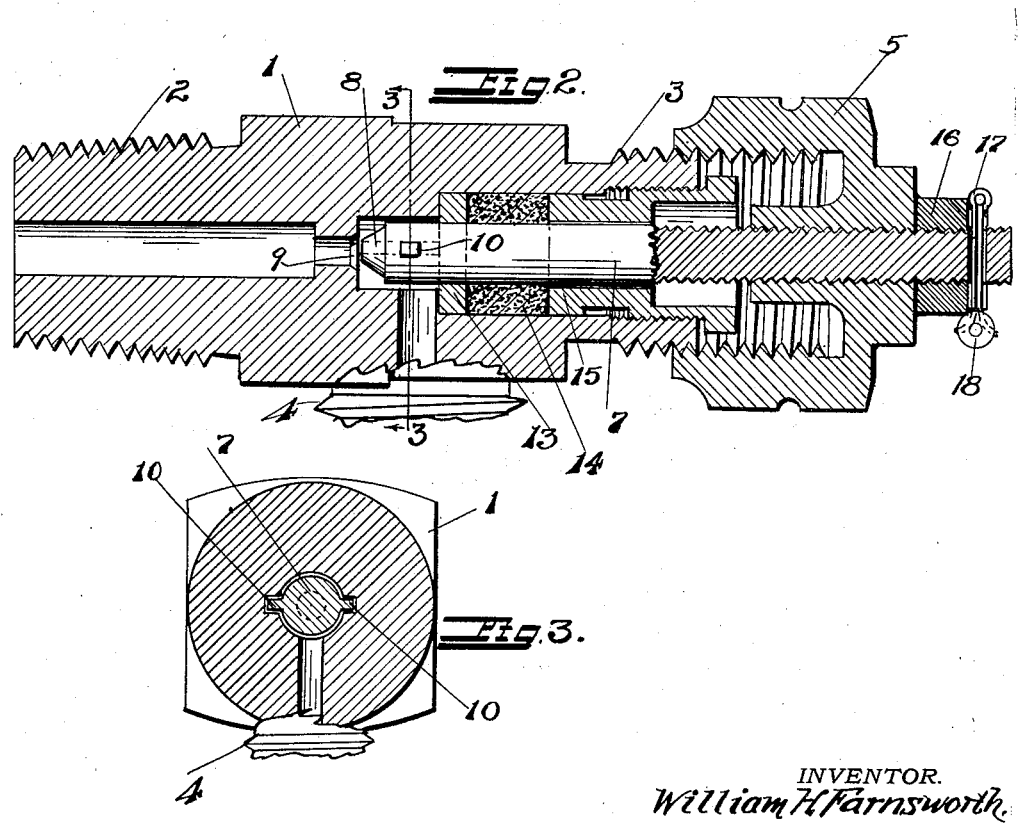
INVENTOR.
William H. Farnsworth,
BY
Carlos P. Griffin
ATTORNEY.

Patented Sept. 13, 1927.

1,642,412

UNITED STATES PATENT OFFICE.

WILLIAM H. FARNSWORTH, OF SAN FRANCISCO, CALIFORNIA, ASSIGNOR TO GREAT WESTERN ELECTRO CHEMICAL CO., OF SAN FRANCISCO, CALIFORNIA, A CORPORATION OF CALIFORNIA.

GAS-TANK VALVE.

Application filed June 17, 1926. Serial No. 116,563.

This invention relates to a gas tank valve, and is especially intended to provide a valve for tanks containing gases under pressure, the valve having only a limited opening when fully opened, and having means to insure it against tampering by unauthorized persons.

It will be understood by those skilled in the art that with pressure tanks such as are used for acetylene, chlorine, carbon dioxide and other gases of that general character, some kind of a valve must be used which will be capable of being opened and regulated with a considerable degree of nicety. Such a valve, if tampered with by unauthorized persons, may get out of adjustment and may sometimes cause considerable damage because of the inability of the user to get the valve closed.

In the present invention means is provided whereby the valve can be opened only a given amount, and further provides means for preventing access to the valve sleeve and stuffing box and at the same time provides means for determining whether the valve has been tampered with by sealing it in such a manner that the valve cannot be tampered with except by breaking the seal.

Other objects of the invention will appear as the description proceeds.

An embodiment of the invention is shown in the accompanying drawings in which the same reference numeral applies to the same portion throughout the several figures of the drawings, and of which there may be modifications.

Figure 1 is a side elevation of the complete valve,

Figure 2 is a longitudinal sectional view of the complete valve on a slightly larger scale than Figure 1, and Figure 3 is a transverse sectional view of the valve on the line 3—3 Figure 2 looking in the direction of the arrows.

The numeral 1 indicates a valve body or casing, which body has the threaded nipples 2, 3 and 4 projecting therefrom. A cap 5 is threaded on the nipple 3 and serves to operate the valve as will be presently described, while a cap 6 is threaded on the nipple 4 and serves as a second closure when the tank is being shipped from place to place.

The nipple 4 provides means for attaching suitable pipe connections to the valve for conveyance of the gas drawn from the cylinder to a place of use or storage. The cap 6 closes and seals this opening when the cylinder is in storage or transit, and guards against loss from valve leakage.

The valve action is secured by the valve stem 7 which is non-rotatably mounted in the valve body, said stem being prevented from rotating by the lugs 10. The lower coned end 8 of the valve stem 7 when pressed against the seat 9 stops the flow of the gas and when raised from its seat permits the gas to flow from the center through the opening in nipple 2, thence through the annular space around the stem 7 through the opening in the nipple 4. Gas leakage through the top of the valve is prevented by the packing 14 which is supported below by the washer 13 and adapted to be compressed to the desired degree to obtain a gas seal at the packing gland 15 which is threaded into the body 1 and has a polygonal top to provide for the easy rotation thereof. The valve stem 7 is pressed against the seat 9 or raised therefrom because the threads carried by it are all of them much less in pitch than the threads of the hand wheel by which it is secured on the valve body.

The operating wheel, or handle 5 has a threaded central opening the same as the threaded portion of the valve stem 7. The valve body nipple 3 has a comparatively coarse thread thereon to receive the cap 5, while the inside of the cap 5 is threaded to correspond with the size and pitch of the valve stem 7, so that as the cap 5 is rotated one turn of a thread of comparatively coarse pitch it will raise the valve stem that much less one turn of the fine pitch thread on the valve stem, since the stem 7 cannot revolve, the result is a differential movement between the threads of the valve cap and the threads of the valve stem.

It is obvious that unless the stem 7 bears definite relation to its seat 9 when the wheel 5 engages, that it may not be possible to turn the wheel 5 far enough to bring the cone into contact with the seat 9 and close the valve. It is also obvious that if the valve wheel 5 is completely unscrewed from the nipple 3 by inexperienced persons that a previous proper relation between the stem 7 and cap 5 will be destroyed thereby. It is desirable to prevent such unauthorized persons from turning the wheel 5 to such a point in which it is no longer in engagement with the threads on the nipple 3. To accomplish this the cap 5 is threaded on the valve stem 7 and a nut 16 on the valve stem prevents the cap from being moved outwardly more than a fixed amount. The nut 16 is of a castellated form and has a cotter pin 17, or a similar device, to hold it in a fixed position, said pin being secured in that position by a lead seal 18.

Inasmuch as the cap 5 is threaded on the nipple 3 with coarse threads, and turns on the valve 7 on fine threads, the lift of the valve stem with respect to the valve casing for one revolution of the cap will be determined by the difference of the respective pitches.

This construction gives a very fine adjustment of the valve and the nut 16 prevents the cap from being twisted off the supporting threads, thereby possibly changing the adjustment of valve stem with respect to the valve cap.

Having thus described my invention, what I desire to secure by Letters Patent of the United States is as follows, but modifications may be made in carrying out the invention as shown in the drawings and in the above particularly described form thereof within the purview of the annexed claims.

1. A gas tank valve of the class described comprising a valve body having a valve seat therein, a stem valve packing surrounding said stem, a cap threaded on said valve body and on the valve stem, a nut on said valve stem with a cotter pin and seal to hold the nut in a fixed position.

2. A valve of the class described comprising a valve body, a valve having a threaded stem therein, lugs on the sides of said stem, said lugs being adapted to slide in slots in said valve body, a threaded cap for said valve body, said cap having a central hole threaded to fit threads on said stem, the threads on said stem being of less pitch than the threads on said cap, and valve body, a nut on the outer end of said stem, a cotter pin and seal to hold said nut in a fixed position when set, to prevent the removal of said cap.

In testimony whereof I have hereunto set my hand this 24th day of May, A. D. 1926.

WILLIAM H. FARNSWORTH.